United States Patent [19]

Summerfield

[11] 3,782,732

[45] Jan. 1, 1974

[54] SELECTABLE MESSAGE VOICE UNIT

[75] Inventor: William F. Summerfield, Huntington Beach, Calif.

[73] Assignee: Mattel, Inc., Hawthorne, Calif.

[22] Filed: July 10, 1972

[21] Appl. No.: 270,113

[52] U.S. Cl. .............. 274/9 RA, 274/1 A

[51] Int. Cl. .............. G11b 3/00, A63h 3/33

[58] Field of Search .............. 274/1 A, 9 RA; 200/5 E, 5 EA, 5 EB

[56] References Cited

UNITED STATES PATENTS

| | | | |
|---|---|---|---|
| 3,584,881 | 6/1971 | Goodkind | 274/9 |
| 3,712,629 | 1/1973 | Watanabe | 274/1 A |
| 3,746,802 | 7/1973 | Sandi | 200/5 E |

*Primary Examiner*—Louis R. Prince
*Assistant Examiner*—Charles E. Phillips
*Attorney*—Seymour A. Scholnick

[57] ABSTRACT

A toy phonograph of the type wherein one of several record tracks to be played is determined by the initial rotational position of the turntable when it begins rotating in a forward direction, in which the mechanism for determining the initial turntable position includes a pawl arm fixed to the turntable and several detents spaced around the turntable that can prevent reverse rotation of the pawl arm past a selected position. A mechanism for assuring that only one of the several detents are at an inward position to engage the pawl at any tine, includes a steel band encircling the pawl arm and engaged with the detents, and positioners that hold the band so the band is "puckered in" at one location to hold a detent inwardly at that location. When another detent is pushed in so it "puckers in" another band location, any detent which was inward is automatically moved out.

7 Claims, 4 Drawing Figures

SELECTABLE MESSAGE VOICE UNIT

BACKGROUND OF THE INVENTION

This invention relates to toy phonographs.

One type of toy phonograph includes a record with many interleaved spiral grooves that have leadin portions circumferentially spaced from one another about the periphery of the record. A tone arm which plays the record moves against the record at a predetermined position prior to each playing, and engages and thereafter plays whichever record groove it encounters when the record begins rotating in a forward direction. Thus, the particular record groove which will be played is determined by the initial rotational position of the record. The record is mounted on a turntable which is rotated in a forward direction by a spring during playing, but which is rotated in a reverse direction when a child pulls on a cord to wind the spring. The position of the record at the beginning of play can be selected by stopping the turntable at a selected position during such reverse rotation. While a variety of mechanisms can be provided to stop the turntable at a selected position during reverse rotation, it is desirable to provide a mechanism for doing this which is as simple and reliable as possible.

SUMMARY OF THE INVENTION

In accordance with one embodiment of the present invention, a simple and reliable selecting mechanism is provided for determining the initial rotational position of a record in a phonograph of the type that selects one of several record grooves to be played in accordance with the initial record position. The selecting mechanism includes a pawl arm fixed to a turntable that is rotated in a forward direction during playing of a record groove and which is urged to rotate in reverse prior to each playing. Several detents are spaced about the pawl arm, each detent being capable of engaging the pawl arm to stop reverse turntable rotation and thereby determine the initial record position at the beginning of playing. A mechanism for assuring that only one detent is at an inward position at a time includes a band of material which is resilient but which resists stretching, such as steel, extending around the pawl arm and engaged with the detents. Several locating walls positioned between the detents confine the band to a circle of a perimeter smaller than the length of the band, so that one location of the band is "puckered in" or locally deformed inwardly. The detent located at the "puckered in" band portion is therefore maintained in an inward position. When another detent is pushed inwardly, the detent which was originally inward is pulled outward, so that only one detent is maintained at an inward position at all times.

The novel features of the invention are set forth with particularity in the appended claims. The invention will best be understood from the following description when read in conjunction with the accompanying drawings.

DESCRIPTION OF THE PREFERRED EMBODIMENT

Figures 1, 2, 3:
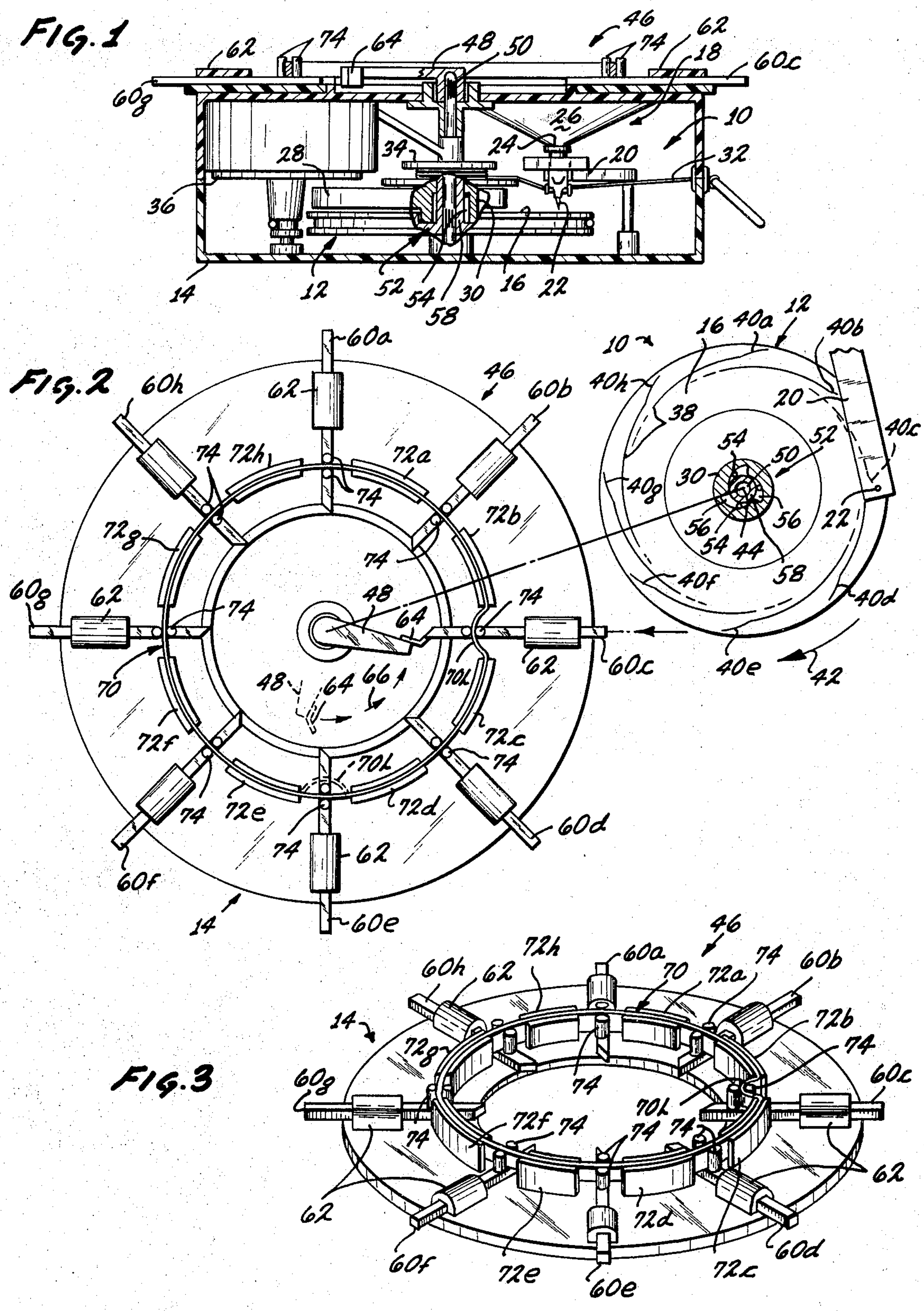
FIG. 1 is a sectional side view of a toy phonograph construction in accordance with the invention.
FIG. 2 is a plan view of the photograph of FIG. 1, and also showing in an exploded form, portions of the mechanism beneath the top of it.
FIG. 3 is a perspective top view of the mechanism of FIG. 1.

FIG. 1 illustrates a toy phonograph or voice unit 10 which includes a turntable 12 rotatably mounted on a housing 14, the turntable carrying a record 16 that has several spiral record grooves. A playing head 18 for playing the record, includes a tone arm 20 that has a stylus 22 which can engage a record groove and which vibrates as the record moves by it. Vibrations of the tone arm are transmitted through a speaker piston 24 to a speaker cone 26 that accoustically amplifies the vibrations. The piston 24 urges the tone arm down towards the record so that the stylus thereof will engage a record groove. The turntable is rotated in a forward direction for playing the record, by a spring 28 that is held on a springy drum 30. Prior to each playing, the spring is wound as a child pulls a cord 32 off a cord-receiving drum 34 that is fixed to the spring drum 30. Each time the cord 32 is pulled, the tone arm 20 is also lifted off the record and moved to the periphery of the record. When the cord is released, the tone arm again moves against the record as the cord rewinds onto the cord drum 34 and the spring turns the turntable at a speed determined by a governor 36. This type of photograph mechanism is well known in the art and has been used for a variety of toys.

Referring also to FIG. 2, the record 16 has eight interleaved spiral record grooves 38 with leadin portions **40*a*–40*h* that are circumferentially spaced from one another about the periphery of the record. When the record begins rotating in a forward direction, as indicated by arrow 42, the stylus 22 enters the first leadin portion such as 40*c* of a record groove that it encounters, and thereafter continues to play only that groove. The stylus 22 always moves against the record at a predetermined rotational position about the axis of rotation 44 of the turntable, so that the record groove to be played is determined by the initial rotational position of the record when the stylus 22** is set down on the record. The particular groove to be played can therefore be selected by selecing the initial rotational position of the turntable when playing begins.

The phonograph has a selector mechanism 46 which enables the selection of a record groove by determining the initial rotational position of the turntable when playing begins. The mechanism includes a pawl arm 48 fixed to a shaft 50 which is fixed to the turntable, so that the pawl arm rotates with the turntable. The turntable 12 is not fixed to the drums 30, 34 that hold the spring and cord, but is connected to them by a one-way clutch 52. The clutch 52 has three pins 54 that lie in recesses 56 of the spring drum 30. These recesses surround a cylinder 58 that is fixed to the shaft 50. When the spring drum 30 rotates in a forward or play direction indicated by arrow 42, the pins 54 are wedged against the cylinder 58 and can drive the turntable with considerable torque. However, during the pulling of the cord 32 to wind the spring, at which time the spring drum 30 rotates in a reverse direction, the pins 54 are not wedged against the cylinder 58 and can transmit only a low torque. If this torque is not sufficient to initially move the turntable, an additional frictional engagement between the spring drum and turntable shaft can be provided. Thus, the turntable is urged to rotate forward and in reverse when the spring drum rotates in these directions, but the turntable can be held stationary while the spring drum rotates in reverse.

The selector mechanism 46 includes eight detents 60*a*–60*h* which are circumferentially spaced about the axis 44 of the turntable. Each of the detents 60 is slidably mounted in a guide 62 which is mounted on the phonograph housing 14. Any one of the detents can be moved inwardly to engage a pawl 64 on the pawl arm 48. When the turntable and pawl arm 48 rotate in the reverse direction as indicated by arrow 66, the pawl arm will also rotate in reverse until the pawl 64 thereon engages the end of a detent. In FIG. 2, the detent 60c is shown moved to a pawl-engaging position, so that it will stop the pawl arm. The pawl arm and turntable cannot rotate any farther in the reverse direction. When the turntable begins rotating in the forward direction, the stylus 22 of the tone arm will engage the first record groove leadin portion 40*c* that it encounters and play the rest of the record groove. Thus, the particular record groove to be played is determined by which of the detents is moved to a position to engage the pawl 64. During forward rotation of the turntable and pawl arm 48, the pawl 64 will repeatedly pass by the detent 60*c* but will not be stopped by it. The pawl 64 is constructed of resilient material and is constructed for readily deflecting past a detent when it moves in a forward direction past the detent. If desired, apparatus can be provided so that the pawl arm 48 is positively driven by the turntable only during reverse turntable rotation, or the detents can be mounted on a mechanism that moves all of them away from the path of the pawl during forward record rotation.

The record groove to be played can be readily selected by shifting one of the detents to a pawl-engaging position. However, it is then necessary that all other detents be held in positions where they cannot engage the pawl arm. Accordingly, apparatus is required for moving any detent which has been in a pawl-engaging position, out of such position when another detent is moved to a pawl-engaging position.

In accordance with the present invention, a mechanism is provided for automatically moving any detent which has been in a pawl-engaging position out of such position. This mechanism includes a steel band 70 which extends around the axis of rotation 44 of the turntable and of the pawl arm. Eight locators 72*a*–72*h* mounted on the phonograph housing confine the band 70 to a nearly circular configuration. Each of the locators 72 includes a pair of upstanding walls trapping a portion of the band 70 between them. Each of the locators is positioned between a pair of detents. The steel band 70 has a somewhat longer length as measured around its periphery than the periphery of the circle defined by the locators 72. As a result, the band 70 does not assume a circular shape, but is "puckered" or locally deflected at one location 70L.

Each of the detents 60 has a pair of upstanding pins 74, and the band 70 extends between their pins. When one of the detents such as 60*c* is pushed inwardly, the pins 74 thereon push a local region 70L of the band inwardly, so that the puckered-in region of the band is the region at that detent. This deflection at 70L produces tension on the band that causes the rest of the band to be pulled tight, so that any puckering-in at other locations is eliminated. Accordingly, if the band 70 was puckered-in at another location as indicated at 70*e*, that band location will move outwardly to its normal configuration where it extends in the circle defined by the locators 72. As the band region 70*e* snaps back, or in other words deflects out, it moves the corresponding detent 60e outwardly. Thus the detent 60*e* which was previously in a pawl-engaging position is moved out of that position. The band 70 therefore serves as a retracting member that retracts any detents which were in a pawl-engaging position when another detent is moved to a pawl-engaging position. The band 70 can be constructed of any flexible material which strongly resists stretching and which is preferably resilient so it can maintain a detent in the inward position. The band is preferably constructed as a continuous loop, although it can be constructed with ends that are anchored in place between a pair of detents.

Figure 4:
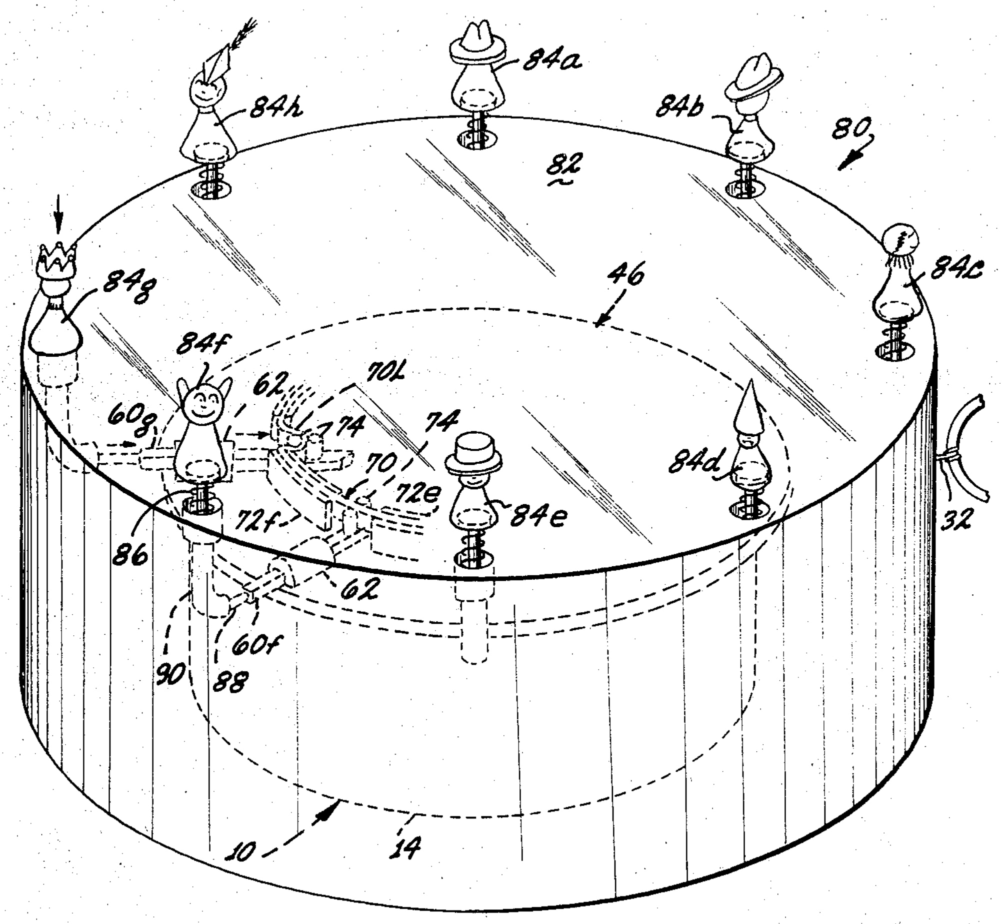
FIG. 4 is a perspective view of a toy apparatus which incorporates the toy phonograph of FIG. 1.

The selectable phonograph can be used in a variety of toys. For example, the phonograph can be used in a doll together with mechanisms that move the detents in accordance with predetermined movements of doll parts. For example, linkages can be provided for moving different detents of a pawl-engaging position when an arm of a doll is moved back or any of a variety of other movements are performed. FIG. 4 illustrates a toy 80 which includes a housing 82 containing the toy phonograph mechanism 10. The toy has eight figures 84*a*–84*h* which form pushbuttons on the housing 82. When one of the figures such as 84*g* is depressed against the force of a return spring 86, a flexible cable 88 is moved through a sheath 90, so that the cable pushes inwardly on a corresponding detent 60*g* of the toy phonograph. That detent is then moved into a pawl-engaging position so that selected one of the record grooves is played. The different figures 84*a*–84*h* represent different characters, and each record groove contains a recording appropriate to the corresponding figure.

Thus, the invention provides a selecting mechanism for a phonograph of the type wherein the turntable is urged to rotate in a reverse direction prior to each playing of the record, the mechanism determining the initial position of the record at the beginning of playing. The mechanism includes a series of detents circumferentially spaced from one another about the axis of rotation of the turntable, a pawl coupled to the turntable to rotate with it at least in the reverse direction and a retracting member for moving any detent out of a pawl-engaging position when another detent is moved to a pawl-engaging position. The retracting member is constructed of a flexible material that strongly resists stretching, and which is confined by locators to a loop with a periphery slightly smaller than the length of the retracting member. When one of the detents is radially deflected so that a local region of a retracting member is deflected with it, tension in the retracting member pulls any other detents out of a pawl-engaging position. The retracting member can be constructed of a material which is not resilient, such as a cable, and it will still serve to retract any detents when another one is moved in. However, in that case, a friction or other holder would be required to maintain the retractor in its pawl-engaging position. The use of a resilient retractor member allows the retractor member to itself hold any detent in a pawl-engaging position.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A phonograph apparatus comprising:

a turntable;

a record mounted on said turntable, said record having a plurality of record grooves with circumferentially spaced leadin portions;

playing head means including stylus means for playing the record groove whose leadin portions lies at a predetermined circumferential position as the turntable begins rotating in a predetermined forward direction;

means for urging said turntable to rotate in a reverse direction and then in said forward direction at each record playing; and selecting means coupled to said turntable for preventing reverse rotation thereof past a predetermined rotational position, including a plurality of detents circumferentially spaced about the axis of rotation of the turntable, pawl means connected to the turntable for engaging a detent to prevent only reverse turntable rotation past the detent, said detents being movable into and out of a position to engage the pawl means, and retracting means coupled to said detents for moving any detent which is in a position to engage the pawl means out of that position when another detent is moved into a pawl means-engaging position.

2. The apparatus described in claim 1 wherein:

said retracting means includes an elongated flexible member which strongly resists stretching, extending about the axis of rotation of the turntable, and a plurality of locating means spaced from one another along said member for confining regions of said member against deflection toward or away from the axis of rotation of the turntable, said detent means engageable with said flexible member at positions between said locating means for locally deflecting said flexible member inwardly.

3. The apparatus described in claim 2 wherein:

said elongated member is constructed of resilient material and is coupled to said detent means to move them outwardly.

4. The apparatus described in claim 1 including:

a toy housing substantially enclosing said turntable;

a plurality of manually movable members mounted on said toy housing; and a plurality of means connecting said manually movable members to said detents, so that a predetermined movement of one of said movable members causes a corresponding detent to move into a position to engage the pawl means.

5. In a phonograph which includes a record-supporting turntable, a playing head which plays a selected one of several tracks of the record in accordance with the initial rotational position of the turntable when it begins turning in a forward direction, and means which urges the turntable to rotate in a reverse direction before it rotates forwardly, the improvement of track selecting means comprising:

a detent-engaging member connected to said turntable to rotate with it at least in a reverse direction;

a plurality of detents spaced from one another about the path of said member, each detent movable into and out of a position to engage said member when the member turns in a reverse direction, to thereby halt reverse rotation of the turntable; and retracting means responsive to movement of a detent into a position to engage the member, for moving any other detent out of a position to engage the member.

6. The improvement described in claim 5 wherein:

siad retracting means includes a resilient band extending about the axis of rotation of the turntable and engaged with the detents, a plurality of locating means spaced about the axis of the turntable and supporting portions of the band located between adjacent detents against deflection, said band being constructed of a material that strongly resists stretching, whereby the local bending of the band by a detent causes the rest of the band to move out of a deflected condition and to move any detent with it.

7. A phonograph comprising:

a housing;

a turntable rotatably mounted on the housing;

a record mounted on the turntable, said record having a plurality of record grooves with leadin portions circumferentially spaced from one another;

playing means including tone arm means mounted on said housing for movement against and away from the record at a predetermined rotational position about the axis of the turntable;

motor means including a cord drum and spring drum fixed together and mounted coaxial with the turntable, a cord coupled to the cord drum and extending past said tone arm means and out of the housing to lift the tone arm means off the record and rotate the drums in a predetermined reverse direction when the cord is pulled and to allow the tone arm means to move onto the record when the cord is released and the drums rotate in a forward direction, and a spring coupled to the spring drum for rotating the drums in a forward direction;

a clutch coupling said drums to said turntable to urge the turntable to rotate while permitting the turntable to remain stationary when prevented from rotating in reverse while the drums rotate in reverse;

an elongated retracting member constructed of resilient material that strongly resists stretching, extending substantially in a ring about the axis of the turntable;

a plurality of locator means spaced along said retracting member and mounted on said member;

a plurality of detents positioned between said locator means along said retracting means, said detents mounted on said housing for movement toward and away from the axis of the turntable to locally deflect a portion of said retracting member and to be moved by the member; and pawl means fixed to the turntable to rotate with it at a position to engage any detent that is in a predetermined radial position, said pawl means constructed to abut a detent which it engages and stop the turntable only during rotation in a reverse direction.

* * * * *